United States Patent
Jung et al.

(10) Patent No.: US 10,636,385 B2
(45) Date of Patent: Apr. 28, 2020

(54) DISPLAY APPARATUS AND CONTROLLING METHOD THEREOF

(71) Applicant: SAMSUNG ELECTRONICS CO., LTD., Suwon-si (KR)

(72) Inventors: Min-joon Jung, Seoul (KR); Tae-yeon Won, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 184 days.

(21) Appl. No.: 15/364,888

(22) Filed: Nov. 30, 2016

(65) Prior Publication Data

US 2017/0154607 A1   Jun. 1, 2017

(30) Foreign Application Priority Data

Dec. 1, 2015   (KR) .......................... 10-2015-0169816

(51) Int. Cl.
| | |
|---|---|
| G09G 5/10 | (2006.01) |
| G06F 3/147 | (2006.01) |
| G06F 3/16 | (2006.01) |
| G06F 3/023 | (2006.01) |
| G06F 1/16 | (2006.01) |
| H05B 37/02 | (2006.01) |
| H05B 33/08 | (2020.01) |

(52) U.S. Cl.
CPC ............ *G09G 5/10* (2013.01); *G06F 1/1605* (2013.01); *G06F 3/023* (2013.01); *G06F 3/147* (2013.01); *G06F 3/16* (2013.01); *G06F 3/165* (2013.01); *H05B 37/0236* (2013.01); *G09G 2354/00* (2013.01); *H05B 33/0896* (2013.01)

(58) Field of Classification Search
CPC .................................................. H05B 37/0236
See application file for complete search history.

(56) References Cited

U.S. PATENT DOCUMENTS

| | | | |
|---|---|---|---|
| 8,602,891 B2 | 12/2013 | Kondo et al. | |
| 2003/0057884 A1* | 3/2003 | Dowling ................ | A61N 5/06 315/291 |
| 2004/0156192 A1* | 8/2004 | Kerr ...................... | G06F 1/1601 362/154 |
| 2005/0047132 A1* | 3/2005 | Dowling ................ | G06F 1/181 362/231 |

(Continued)

FOREIGN PATENT DOCUMENTS

| | | |
|---|---|---|
| CN | 1938666 A | 3/2007 |
| CN | 102348149 A | 2/2012 |

(Continued)

OTHER PUBLICATIONS

Search Report dated Mar. 10, 2017 issued by the International Searching Authority in counterpart International Application No. PCT/KR2016/013839 (PCT/ISA/210).

(Continued)

*Primary Examiner* — Robin J Mishler
(74) *Attorney, Agent, or Firm* — Sughrue Mion, PLLC

(57) ABSTRACT

A display apparatus and a controlling method thereof are provided. The display apparatus may include: a display panel that displays a screen; a light source disposed at one side of the display panel; an audio input that receives an audio signal; and a processor that flickers the light source in response to the received audio signal.

20 Claims, 23 Drawing Sheets

(56) References Cited

U.S. PATENT DOCUMENTS

| | | | |
|---|---|---|---|
| 2007/0132748 A1 | 6/2007 | Choi | |
| 2007/0254589 A1* | 11/2007 | Sloan | A63J 17/00 |
| | | | 455/47 |
| 2011/0051019 A1 | 3/2011 | Hardacker et al. | |
| 2011/0141358 A1 | 6/2011 | Hardacker et al. | |
| 2012/0020483 A1 | 1/2012 | Deshpande et al. | |
| 2015/0061884 A1 | 3/2015 | Hwang et al. | |
| 2015/0163886 A1 | 6/2015 | Park | |
| 2016/0073191 A1* | 3/2016 | Kettering | H05B 33/0842 |
| | | | 381/74 |

FOREIGN PATENT DOCUMENTS

| | | |
|---|---|---|
| EP | 2 846 539 A1 | 3/2015 |
| JP | 2015-38820 A | 2/2015 |
| KR | 10-2008-0023937 A | 3/2008 |
| KR | 10-0814342 B1 | 3/2008 |
| KR | 20-2010-0008633 U | 9/2010 |
| KR | 10-2011-0060506 A | 6/2011 |
| KR | 10-1414083 B1 | 7/2014 |
| WO | 2005/083547 A2 | 9/2005 |

OTHER PUBLICATIONS

Written Opinion dated Mar. 10, 2017 issued by the International Searching Authority in counterpart International Application No. PCT/KR2016/013839 (PCT/ISA/237).
Communication dated Apr. 5, 2018 by the European Patent Office in counterpart European Patent Application No. 16870999.6.
Communication dated Apr. 8, 2019, issued by the European Patent Office in counterpart European Application No. 16870999.6.
Communication dated Dec. 16, 2019, issued by the Korean Intellectual Property Office in counterpart Korean Application No. 10-2015-0169816.
Communication dated Jan. 3, 2020 issued by the State Intellectual Property Office of P.R. China in counterpart Chinese Application No. 201680059352.1.
Communication dated Jan. 22, 2020, issued by the European Patent Office in counterpart European Application No. 16 870 999.6.
Sonelec-Musique: "Modulateur de lumiere", XP055461571, Jul. 10, 2011, Retrieved from URL: <http://www.sonelec-musique.com/electronique_realisations_modulateur_jumiere_002.html>, Retrieved on Mar. 21, 2018, 6 pages.
Sonelec-Musique, "Modulateur de lumiere", XP055461712, Jul. 10, 2011, 10 pages, Retrieved from URL: <http://www.sonelec-musique.com/electronique_realisations_modulateur_lumiere_001.html>.
Communication dated Mar. 13, 2020, issued by the European Patent Office in counterpart European Application No. 20155916.8.

* cited by examiner

DISPLAY APPARATUS AND CONTROLLING METHOD THEREOF

CROSS-REFERENCE TO RELATED APPLICATION

This application claims priority from Korean Patent Application No. 10-2015-0169816, filed on Dec. 1, 2015 in the Korean Intellectual Property Office, the disclosure of which is incorporated herein by reference in its entirety.

BACKGROUND

Field

Apparatuses and methods consistent with one or more exemplary embodiments relate to a display apparatus and a controlling method thereof, and more particularly, to a display apparatus and a controlling method thereof which are capable of providing a lighting effect in response to an extracted sound signal.

Description of the Related Art

In recent years, users of a display apparatus have desired to obtain a vivid user experience through various effects and interaction while simply enjoying content displayed on a screen.

Conventionally, a display apparatus such as a monitor does not include a lighting component, and therefore a user may have difficulty in purchasing separate lighting equipment to obtain a lighting effect and attaching the purchased lighting equipment to the monitor. In this case, the display apparatus must include a separate power supply.

Attempts to obtain an interworking effect with the lighting by sensing a sound have been conducted. However, the existing technology uses a scheme of receiving a specific external sound as an input, and therefore when ambient noise is present, there may a problem in that a lighting control may not be accurately performed. Further, when the user dons an earphone or a headphone, a particular sound may not be detected, and therefore the lighting effect cannot be obtained.

Further, the existing technology uses a scheme of controlling lighting brightness based on a sound volume. In this case, when the user increases a volume, the existing technology generally keeps the lighting bright, and therefore a problem may arise in that the user may not be able to focus on content.

SUMMARY

Exemplary embodiments may overcome the above disadvantages and other disadvantages not described above. Also, exemplary embodiments are not required to overcome the disadvantages described above, and an exemplary embodiment may not overcome any of the problems described above.

One or more exemplary embodiments provides a display apparatus and a controlling method thereof capable of controlling lighting brightness in response to a high frequency component of an audio signal.

According to an aspect of an exemplary embodiment, a display apparatus includes: a display panel configured to display a screen; a light source disposed at one side of the display panel; an audio input configured to receive an audio signal; and a processor configured to flicker the light source in response to the received audio signal.

According to an aspect of another exemplary embodiment, a method of controlling a display apparatus includes: receiving an audio signal; separating a high frequency signal component from the received audio signal; and flickering a light source included in the display apparatus in response to the separating the high frequency signal component.

As described above, according to various exemplary embodiments, it is possible to provide a user experience capable of interactively reacting to the user by the lighting effect interworking with the audio as well as the display screen.

BRIEF DESCRIPTION OF THE DRAWINGS

The above and/or other aspects will be more apparent by describing certain exemplary embodiments with reference to the accompanying drawings, in which.

DETAILED DESCRIPTION

Hereinafter, exemplary embodiments will be described in detail with reference to the accompanying drawings. Further, when it is deemed that a detailed description for the known function or configuration related to the exemplary embodiments may obscure the gist of the exemplary embodiments, the detailed description therefor will be omitted. Further, the following terminologies are defined in consideration of the functions of the exemplary embodiments and may be construed in different ways by the intention of users and operators or practice. Therefore, the definitions thereof should be construed based on the contents throughout the specification.

Terms including an ordinal number such as 'first', 'second', etc. can be used to describe various components, but the components are not to be construed as being limited to the terms. The terms are used to distinguish one component from another component. Therefore, the first component may be referred to as the second component, and the second component may be referred to as the first component without deviating from the scope of the exemplary embodiments. The term 'and/or' includes a combination of a plurality of relevant items or any one of a plurality of relevant terms.

Terms used in the present specification are used only in order to describe specific exemplary embodiments rather than limiting the present disclosure. Singular forms are intended to include plural forms unless the context clearly indicates otherwise. It will be further understood that the terms "comprises", "includes" or "have," as used in this specification, specify the presence of stated features, numerals, steps, operations, components, parts, or a combination thereof, but do not preclude the presence or addition of one or more other features, numerals, steps, operations, components, parts, or a combination thereof.

Figure 1A:
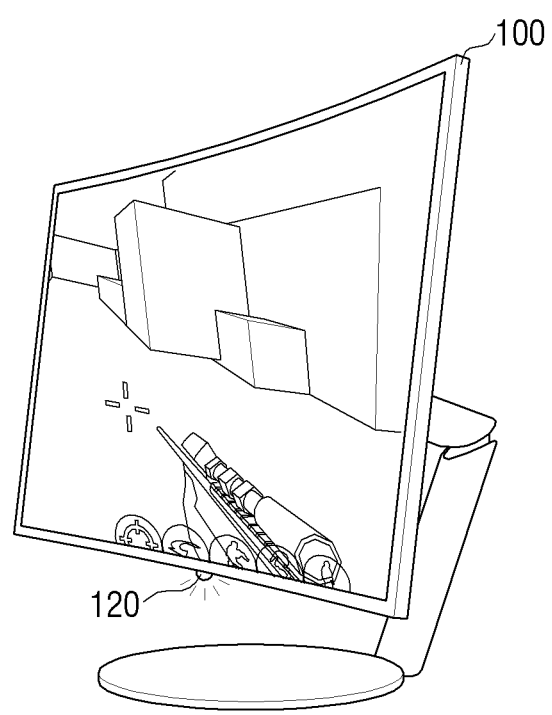
FIGS. 1A and 1B are diagrams for describing a display apparatus, according to various exemplary embodiments.
Figure 1B:
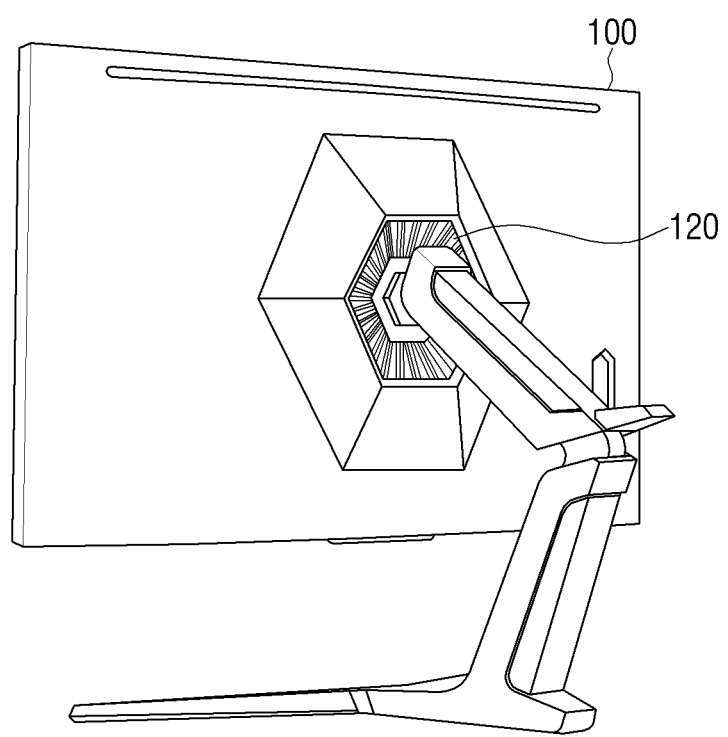

FIGS. 1A and 1B are diagrams for describing a display apparatus 100, according to various exemplary embodiments. The display apparatus 100 according to an exemplary embodiment may display a content effect on a screen and display the content effect even despite a change in a surrounding environment. For example, the display apparatus 100 may provide a lighting effect that varies based on an audio signal of a specific frequency, such as, for example, a gunshot sound in a context of game content.

The display apparatus 100, according to an exemplary embodiment, may diverge light to a peripheral part of the screen. As a result, the display apparatus 100 may increase a user's immersion in content such as a game while reducing eyestrain. For example, as illustrated in FIG. 1A, a lighter (also referred to herein as a "light source") 120 may be disposed at a bottom surface of the display apparatus 100. As another example, as illustrated in FIG. 1B, the lighter 120 may be disposed at a rear surface of the display apparatus 100. According to an exemplary embodiment, FIGS. 1A and 1B illustrate the display apparatus 100 having the single lighter 120 disposed at the bottom or the rear surface thereof, but the exemplary embodiments are not limited thereto. The display apparatus 100 may include a plurality of lighters 120, and the lighter 120 need not necessarily be disposed at the bottom surface or the rear surface of the display apparatus 100.

The display apparatus 100 according to an exemplary embodiment may be operated in three modes. First, the display apparatus 100 may be operated in a first mode that does not provide the lighting effect. Further, the display apparatus 100 may be operated in a second mode that controls lighting brightness based on a high frequency signal. The second mode may also be called an interactive mode. Finally, the display apparatus 100 may be operated in a third mode that changes the lighting brightness at a predetermined interval regardless of a sound. The third mode may also be called a dimming mode.

Hereinafter, an example in which the display apparatus 100 is operated in the interactive mode that is the second mode will be described.

Figure 2:
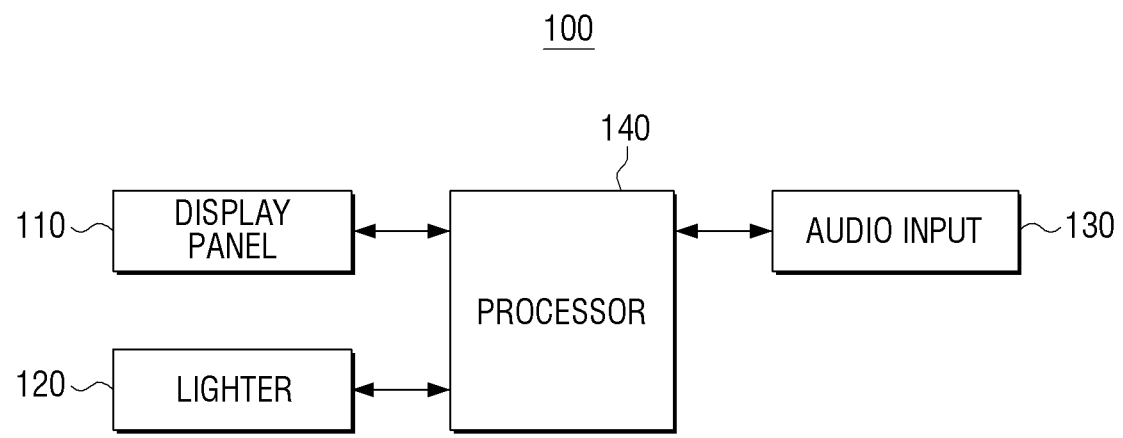
FIG. 2 is a schematic block diagram for describing a configuration of the display apparatus, according to an exemplary embodiment.

FIG. 2 is a schematic block diagram for describing a configuration of the display apparatus 100, according to an exemplary embodiment. Referring to FIG. 2, the display apparatus 100 is configured to include a display panel 110, the lighter 120, an audio input 130, and a processor 140.

The display panel 110 may display a screen. The screen may include content received from the outside or pre-stored content. For example, game content may be displayed on the screen. Further, the screen may include any of various objects such as an icon, a text, and an image. Various objects may also include a user interface (UI) element that may interact with a user and may be fed back based on a user input.

The lighter 120 may provide any of various lighting effects based on flickering of lighting, a change in brightness, a change in divergence direction of light, or the like. The lighter 120 may be disposed at one side of the display panel 110. For example, the lighter 120 may be disposed at a bottom surface or a rear surface of the display panel 110. In detail, the lighter 120 may be disposed at one side of a bezel that encloses the display panel 110. In the case of the display apparatus 100 formed without the bezel, the lighter 120 may also be disposed at one side of the display panel 110 itself.

The audio input 130 may receive an audio signal. The audio input 130 may receive the audio signal via any of a sound card, a high-definition multimedia interface (HDMI), a display port (DP), or the like, instead of receiving a sound from the external environment. Therefore, the processor 140 may control the lighter 120 to correspond to the same signal as the audio signal output from the display apparatus 100 without being affected by the external environment.

The processor 140 may flicker the lighter 120 in response to the received audio signal. Further, the processor 140 may control the lighter 120 to perform the flickering and the change in lighting brightness, the adjustment in divergence direction of light, or the like.

The processor 140 may control the lighter 120 in response to a high frequency signal (also referred to herein as a "high frequency signal component") from among the audio signals. For example, a gunshot sound effect that is generated in a first person shooter (FPS) game corresponds to a high frequency audio signal. The processor 140 may control the lighter 120 to be flickered in response to the generation of the gunshot sound in the FPS game.

Further, the processor 140 may change a brightness level of the lighter 120 in response to the level of the high frequency signal. For example, the processor 140 may change the brightness level in response to a ratio of components sorted as the high frequency signal among the components of all of the input audio signals (i.e., a ratio between an amplitude of the high frequency signal and a combined amplitude of all input audio signals). Therefore, the processor 140 may accurately control the brightness level in response to the high frequency signal independently of a volume adjustment of the user or the use of the earphone. For example, the brightness level may be defined based on a preset value and may be defined based on the setting of the user.

According to the display apparatus 100 according to various exemplary embodiments as described above, various effects and interactions may be provided to the user via an outside of the screen. The user using the game content may feel a game effect through a monitor screen and a change in surrounding environment based on lighting. Therefore, the user may obtain a user experience that includes enjoying contents such as a game with more immersion.

Figure 3:
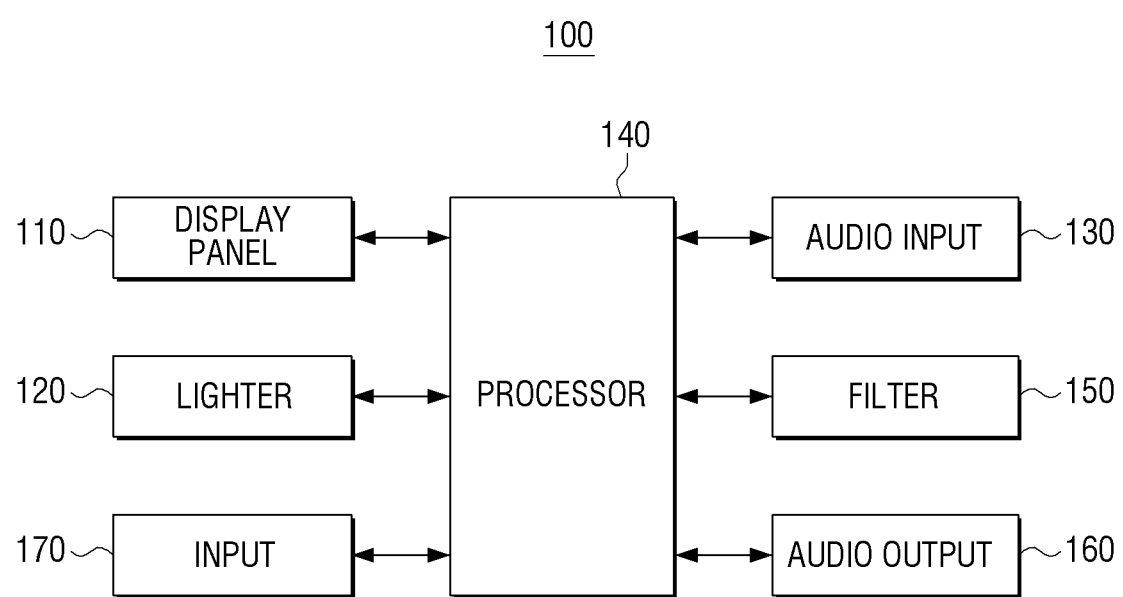
FIG. 3 is a block diagram illustrating, in detail, a configuration of the display apparatus, according to an exemplary embodiment.

FIG. 3 is a block diagram for describing in detail the configuration of the display apparatus 100, according to an exemplary embodiment. Referring to FIG. 3, the display apparatus 100 is configured to include the display panel 110, the lighter 120, the audio input 130, the processor 140, a filter 150, an audio output 160, and an input 170. However, the display apparatus 100 according to the exemplary embodiment is not limited as including all the components as described above. Further, the display apparatus 100 may additionally include components that are not illustrated in the exemplary embodiment of FIG. 3. For example, the display apparatus 100 may further include a hinge part (not illustrated) configured to facilitate movement of the lighter 120.

The display panel 110 may display a video frame that results from image processing or at least one of various screens that results from graphic processing. For example, the display panel 110 may display screens such as a game application, a moving picture reproduction application, and a broadcasting application.

An implementation scheme of the display panel 110 is not limited and may be implemented as any of various types of displays, such as a liquid crystal display (LCD), an organic light emitting diode (OLED), an active-matrix organic light-emitting diode (AM-OLED), and a plasma display panel (PDP). In the present specification, it is considered that the display panel 110 may include additional components such as a backlight unit (not illustrated), depending on the implementation scheme.

The display panel 110 may be implemented as a touch screen form having a mutual layer structure together with a touch pad, and the touch screen may be configured to detect a touch input position, a touch area, and a pressure of a touch input. In this case, the display panel 110 may also perform a function of the input 170.

The display panel 110 is a bended display form and may also be coupled with at least one of a front area, a side area, and a rear area of the display apparatus 100. The bended display may also be implemented as a flexible display and may also be implemented as a rigid display that does not have flexibility. For example, the bended display may be configured by connecting a plurality of flat displays to each other.

When the bended display is implemented as the flexible display, the flexible display may be warped, bent, or rolled without any damage due to a thin and flexible substrate such as paper. The flexible display may also be manufactured using a conventional glass substrate and a plastic substrate. In the case of using the plastic substrate, to prevent the substrate from being damaged, the flexible display may be manufactured by using a low-temperature manufacturing process without using the existing manufacturing process. Further, the flexible display may have flexibility to be foldable by replacing a glass substrate enclosing a liquid crystal by a plastic film, in the liquid crystal display (LCD), the organic light emitting diode (OLED), the active-matrix organic light-emitting diode (AM-OLED), and the plasma display panel (PDP), or the like. The flexible display may be thin, light, and strong against impact, may be warped or bent, and may be manufactured in any of various forms.

The lighter 120 may provide various lighting effects. For example, the lighter 120 may provide any of various lighting effects such as the flickering, the change in brightness level, and the change in divergence direction of light by the control of the processor 140.

The lighter 120 may be disposed at one side of the display panel 110. For example, the lighter 120 may be disposed at the bottom surface or the rear surface of the display panel 110. Further, the lighter 120 may include a plurality of sub lightings (also referred to herein as "sub lighting elements"). For example, the plurality of sub lightings may be disposed at the outside of the display panel 110 at a predetermined spatial interval. As another example, the plurality of sub lightings may be separately disposed at a left bottom portion and a right bottom portion.

The audio input 130 may receive the audio signal. For example, the audio input 130 may receive an audio signal generated by content. The audio input 130 may be implemented as any of the sound card, the high-definition multimedia interface (HDMI), the display port (DP), or the like. In the present exemplary embodiment, the audio input 130 receives the audio signal of the content displayed on the screen, as opposed to receiving a voice from external environment such as a microphone. For example, when an execution screen of the game application is displayed on the screen, the audio input 130 may receive a gunshot sound effect, an explosion sound effect, traffic noise, a voice of game character in a game, or the like.

The filter 150 may separate the input audio signal based on a frequency band. In detail, the filter 150 may divide the input audio signal into a high frequency signal component and a low frequency signal component on a preset band (i.e., a predetermined frequency boundary). According to an exemplary embodiment, the filter 150 may be implemented as a high pass filter to separate only the high frequency signal component that is equal to or greater than the minimum frequency of the preset frequency band.

According to another exemplary embodiment, the filter 150 may also compare frequency sampling analysis values in order to divide the audio signal by frequency. For example, as a result of analyzing the sampled data and representing the analyzed data by a graph, a peak is generated at a portion corresponding to the frequency included in the audio signal. The filter 150 may perform the sampling operation and an analog-to-digital converter (ADC) operation.

The audio output 160 outputs the audio signal processed by the processor 140. The audio output 160 may be integrated with or separated from the display apparatus 100, in which the separated audio output 160 is connected to the display apparatus 100 in a wired or wireless manner.

The input 170 may receive, from the user, a request, a command, and/or other data for controlling the operation of the display apparatus 100. The input 170 may be disposed at one side of the display panel 110 in a physical form. For example, the input 170 may be implemented as a plurality of tactile keys at a lower portion of the front surface of the display panel 110. As another example, the input 170 may also be implemented on the rear surface of the display panel 110 in a jog switch form. Further, the input 170 may be implemented in the touch screen form and thereby configured to receive the user input as a result of the user touching the UI displayed on the display panel 110.

The storage (not illustrated) may store various programs and data required to operate the display apparatus 100. The storage (not illustrated) may be implemented in forms such as a flash memory and a hard disk. For example, the storage (not illustrated) may include a read-only memory (ROM) for storing programs that execute the operation of the display apparatus 100, a random access memory (RAM) for temporarily storing data that results from the execution of the operation of the display apparatus 100, or the like. Further, the storage may further include an electrically erasable and programmable ROM (EEPROM) for storing various reference data.

The storage (not illustrated) may store programs and data for configuring various screens that will be displayed on the display panel 110. Further, the storage (not illustrated) may store data such as the brightness level and the output setting value. For example, as the output setting value, there may be any one or more of a black equalizer value, a response time, a refresh rate, a free sync setting, a low input lag setting, a picture mode setting, a low motion blur setting, or the like.

The processor 140 may control the remaining components of the display apparatus 100. For example, the processor 140 may control the lighter 120 in response to the high frequency signal from among the input audio signals. For example, since a shooting sound in the FPS game mainly corresponds to a high frequency, the processor 140 may provide the lighting effect interworking therewith to provide the lively user experience to the user. Further, the processor 140 may change the brightness level of the lighter 120 in response to the level (i.e., amplitude) of the high frequency signal.

The detailed operation of the processor 140 will be described below with reference to the accompanying drawings.

Figure 4:
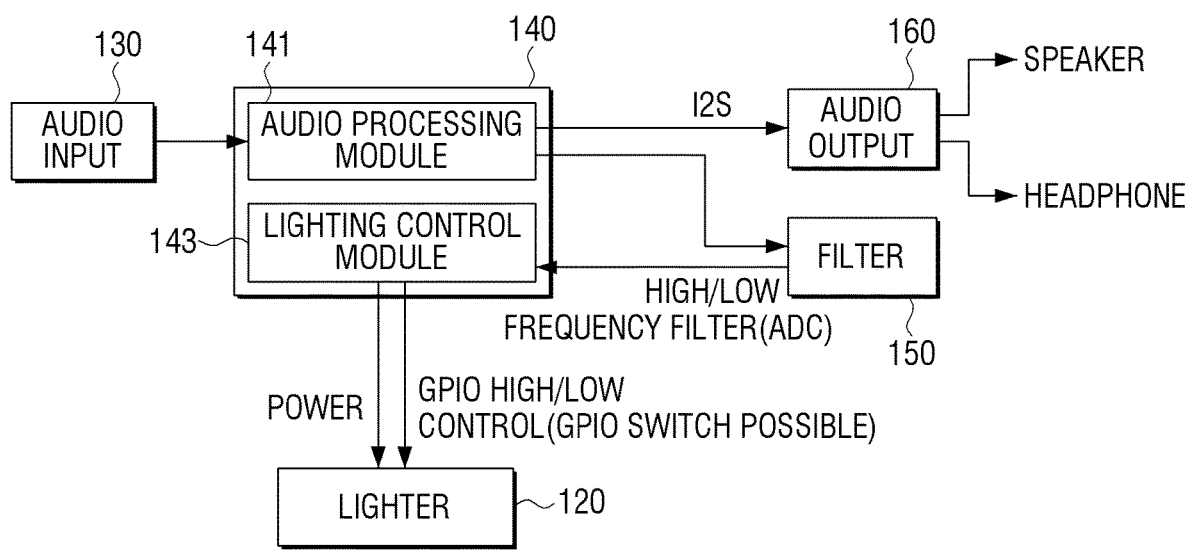
FIG. 4 is a diagram for describing a method for processing an audio signal in the display apparatus, according to an exemplary embodiment.

FIG. 4 is a diagram for describing processing of an audio signal in the display apparatus 100, according to an exemplary embodiment. For convenience of explanation, FIG. 4 illustrates that the processor 140 includes an audio processing module 141 and a lighting control module 143. As illustrated in FIG. 4, the processor 140 may be configured as a set of separate chips by function module and may also perform a plurality of functions in one single chip.

Referring to FIG. 4, it may be appreciated that the audio signal is input from the audio input 130 implemented as the HDMI and the DP to the audio processing module 141.

The processor 140 may process the input audio signal based on the currently set mode of the display apparatus 100 to determine whether to control the lighter 120 to interwork therewith. For example, if the set mode does not correspond to the interactive mode (second mode), the processor 140 need not interwork the audio signal with the lighting effect, and therefore processes the input audio signal and provide the processed audio signal to the audio output 160.

If the set mode corresponds to the interactive mode (second mode), the processor 140 may control the operation of the lighter 120 in response to the input audio signal.

In detail, the audio processing module 141 may transmit the input audio signal via two paths. First, the audio processing module 141 may process the input audio signal and transmit the processed audio signal to the audio output 160. For example, the audio processing module 141 may transmit the audio signal to the audio output 160 via an integrated interchip sound (I2S) bus. Further, the audio output 160 may output the received audio signal. If the audio output 160 is implemented in an output port form, the audio signal may also be output via an external speaker, a headphone, or the like.

Further, the audio processing module 141 may transmit the input audio signal to the filter 150. The filter 150 may divide the audio signal into the high frequency component and the low frequency component. The audio signal divided by the filter 150 based on the frequency band may be re-input (i.e., fed back) to the processor 140. The lighting control module 143 may control the lighter 120 in response to the audio signal of the high frequency component. For example, the lighting control module 143 may supply power to the lighter 120 only when the audio signal of the high frequency component is present. As another example, the lighting control module 143 may change the brightness level of the lighter 120 in response to the level (i.e., amplitude) of the high frequency component.

Figure 5:
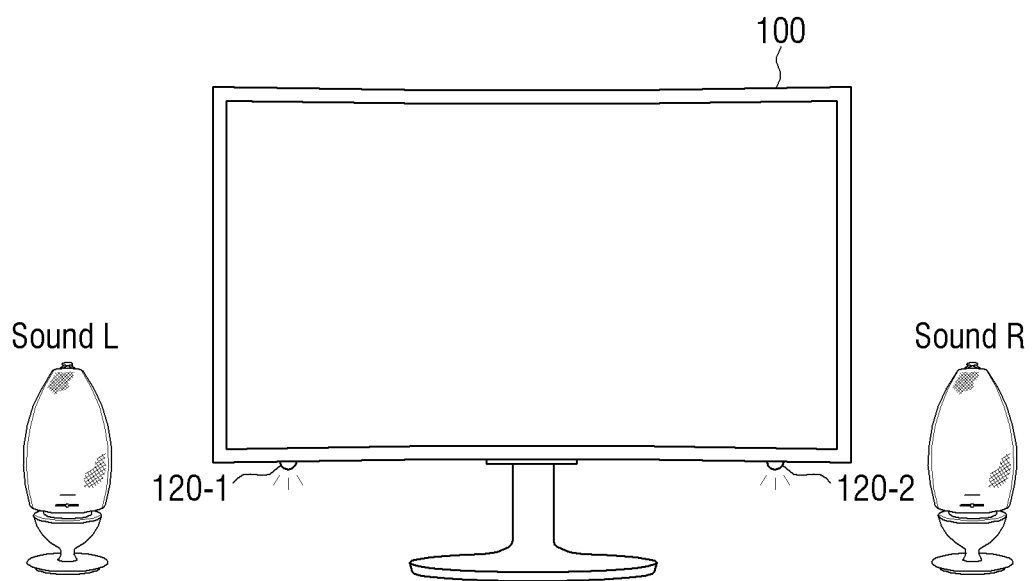
FIG. 5 is a diagram for describing a method for dividing left and right audio signals in the display apparatus, according to an exemplary embodiment.

According to an exemplary embodiment, the processor 140 may also control the lighter 120 in response to the left and right audio signals as well as the frequency band. According to an exemplary embodiment as illustrated in FIG. 5, the audio output 160 is illustrated as a stereo type speaker. However, when the left and right sound signals may be divided even by a means other than the stereo type speaker as illustrated in FIG. 5, the processor 140 may flicker the sub lighting disposed at the corresponding position.

To provide a three-dimensional effect, the audio signal included in the content may be divided into the left audio signal and the right audio signal and then provided. The processor 140 may divide the input audio signal into the left audio signal and the right audio signal. Further, the processor 140 may flicker some of the plurality of sub lightings in response to the divided left audio signal. Further, the processor 140 may flicker the remainder of the plurality of sub lightings in response to the divided right audio signal.

Referring to FIG. 5, the display apparatus 100 may include a plurality of sub lightings (also referred to herein as "sub lighting elements") 120-1 and 120-2 which are respectively disposed at left and right sides of the bottom portion of the display panel 110. When the left audio signal is present, the processor 140 may control the audio output 160 to output the left audio signal through the left speaker. Further, the processor 140 may control the left sub lighting 120-1 to be flickered in response to the left audio signal.

In contrast, when the right audio signal is present, the processor 140 may control the audio output 160 to output the right audio signal through the right speaker. Further, the processor 140 may control the right sub lighting 120-2 to be flickered in response to the right audio signal.

Even in the exemplary embodiment illustrated in FIG. 5, the processor 140 may control the filter 150 to separate the high frequency component of the audio signals which have been divided into the left audio signal and the right audio signal. Further, the processor 140 may change the brightness levels of each of the plurality of sub lightings 120-1 and 120-2 in response to the level of the high frequency component. For example, if both of the left audio signal and the right audio signal have the high frequency component and the level of the high frequency component of the left audio signal is larger (i.e., the amplitude is greater) than that of the right audio signal, the processor 140 may perform a control to cause the left sub lighting 120-1 to output brighter light than the right sub lighting 120-2.

The exemplary embodiment of FIG. 5 describes only the left and right channel stereo systems, but even in the case of a 5.1 channel sound system, the processor 140 may allocate the plurality of sub lightings to each channel and control each of the allocated sub lightings in response to the respective audio signals of the corresponding channels.

According to an exemplary embodiment, if an event is generated in one area of the screen regardless of the sound, the processor 140 may flicker the lighter 120 to correspond to the position at which the event is generated.

For example, the case in which the FPS game is provided to the screen displayed on the display panel 110 may be assumed. When the user performs shooting toward a right target on a screen, the processor 140 may control the right sub lighting element 120-2 to be bright. By doing so, the three-dimensional effect of game may be improved.

In addition to the exemplary embodiment to control the lighter 120 by being merely directional (left or right), the processor 140 may flicker each of the sub lightings such that each has a brightness level that varies based on the position at which the event is generated on the screen displayed on the display panel 110 and a distance between the respective sub lightings.

Figure 6A:
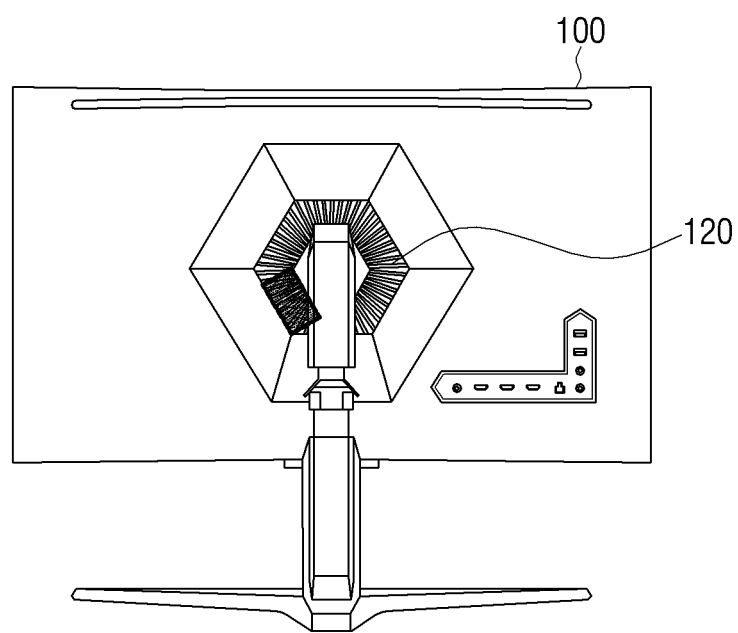
FIGS. 6A and 6B are diagrams for describing a method for controlling lighting in a specific direction in a display apparatus, according to an exemplary embodiment.

FIG. 6A is a diagram illustrating an exemplary embodiment in which the lighter 120 is disposed at the rear surface of the display panel 110. Referring to FIG. 6A, the lighter 120 may include six sub lighting elements configured to diverge light in six directions. If the event is generated at the lower area of the right side of the screen, the processor 140 may control the corresponding sub lighting element, which may diverge light to the lower right, to be flickered, from among the plurality of sub lighting elements. Alternatively, the processor 140 may also set the brightness level of the sub lighting element of the corresponding portion to be higher than the rest of the sub lighting elements.

If the event generated on the screen is an event representing a trajectory of a missile in the FPS game, the processor 140 may change the sub lighting element that is flickered in correspondence with the trajectory. Referring to FIG. 6A, if the trajectory generated on the screen is from the lower right toward the upper right, the processor 140 may control the sub lighting element at the lower right to diverge light and then control the sub lighting element at the upper right to diverge light while turning off the sub lighting element at the lower right.

Figure 6B:
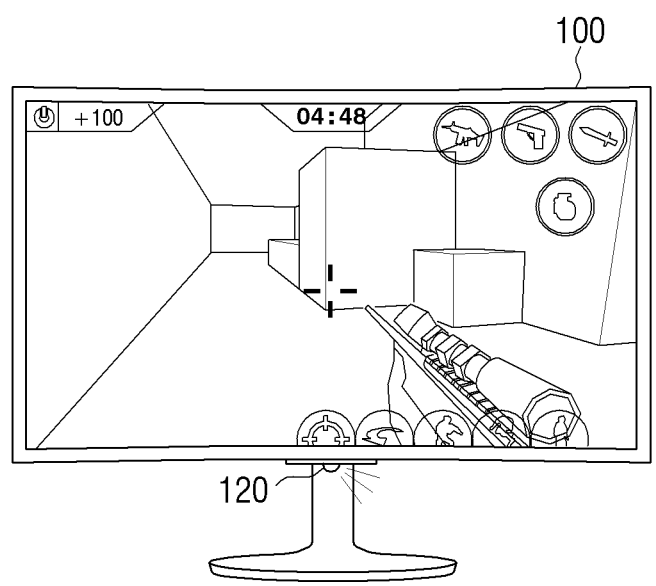

FIG. 6B is a diagram illustrating an example in which the single light source 120 is disposed at the bottom of the display panel 110. Even when the single light source 120 is implemented, the display apparatus further includes the hinge part that may facilitate changing the direction of the light source 120 to change the divergence direction of light. If the event is generated in one area of the screen displayed on the display panel 110, the processor 140 may control the hinge part in order to change the direction of the light source 120 based on the position where the event is generated. For example, as illustrated in FIG. 6B, if the event is generated in the right area of the screen, the processor 140 may control the hinge part to rotate the lighter 120 to the right.

The display apparatus 100 according to an exemplary embodiment may display various kinds of contents. To provide the optimal screen, the output setting value of the display panel needs to be variably set based on the kind of contents displayed.

For example, the display apparatus 100 may display various kinds of game contents. An example of the kind of game contents may include a role playing game (RPG), a real time strategy (RTS), and a first person shooter (FPS). Most recent games request a relatively high scan rate, but the optimized screen mode varies based on genres of each game content. For example, the RPG is optimized for a bright screen mode and the RTS is optimized for a dark screen mode. In this regard, a necessity for a function of easily changing a screen mode to an optimized screen mode is increased.

The display apparatus 100 according to an exemplary embodiment may provide a function of enabling a user to easily change an output setting value of the display panel 110. The processor 140 may change the output setting value of the display panel 110 in response to a user command that is received via the input 170 disposed at one side of the display panel 110.

The display apparatus 100 according to an exemplary embodiment may include the input 170 configured of a plurality of tactile keys. Referring to the exemplary embodiment illustrated in FIG. 7A, the input 170 configured of three tactile keys is disposed at a lower portion of the front surface of the display panel 110. Further, if one of the three tactile keys is selected, the processor 140 may change the output setting value of the display panel 110 to the pre-stored output setting value that corresponds to the selected tactile key.

For example, the output setting values optimized for the games of three genres such as RPG, RTS, and FPS may be stored in three tactile keys, respectively. If the user input selecting the tactile key that corresponds to the RPG game among the plurality of tactile keys is input, the processor 140 may change the output setting value of the display panel 110 to the output setting value optimized for the RPG game that corresponds to the selected tactile key.

Further, if one of the plurality of tactile keys is selected, the processor 140 may control the display panel 110 to display a UI 710 that provides information that relates to the pre-stored output setting value corresponding to the selected key.

Figure 7A:
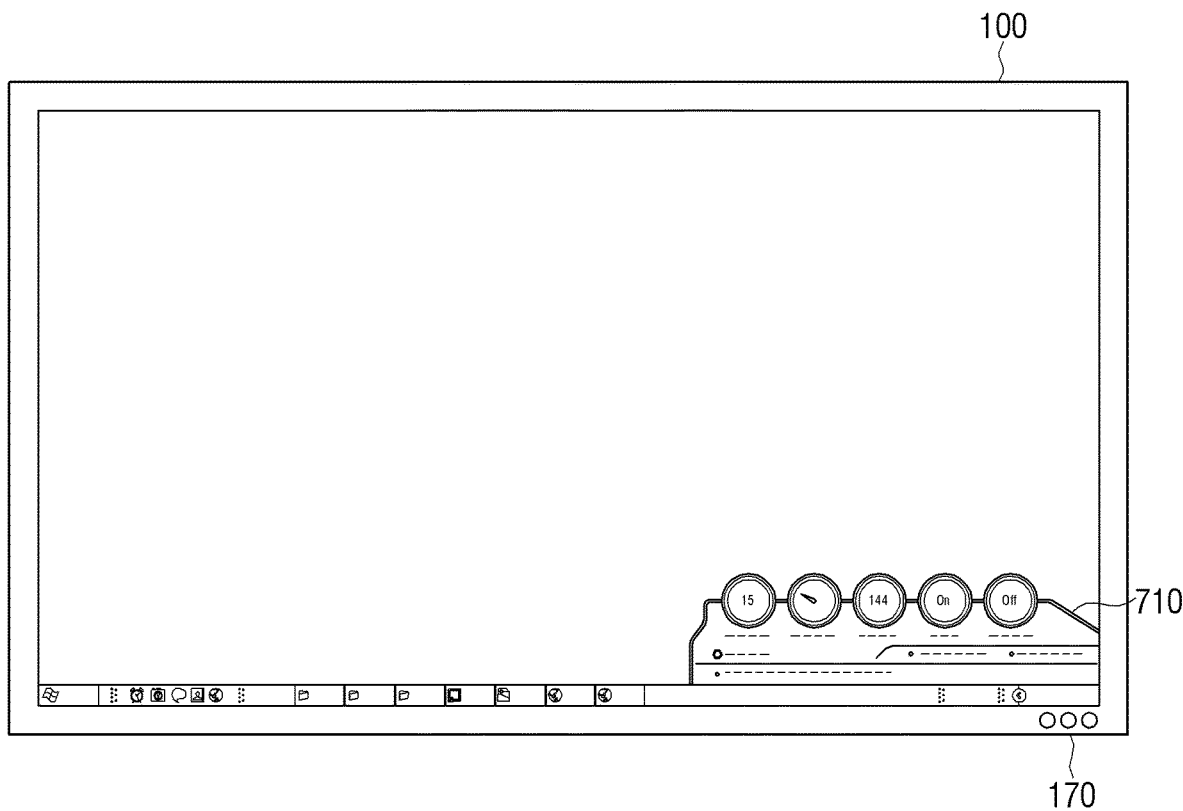
FIGS. 7A, 7B, 8A, 8B, 8C, 8D, 8E, 9A, 9B, 9C, 9D, 9E, and 9F are diagrams illustrating an output setting value of a display apparatus, according to an exemplary embodiment.
Figure 7B:
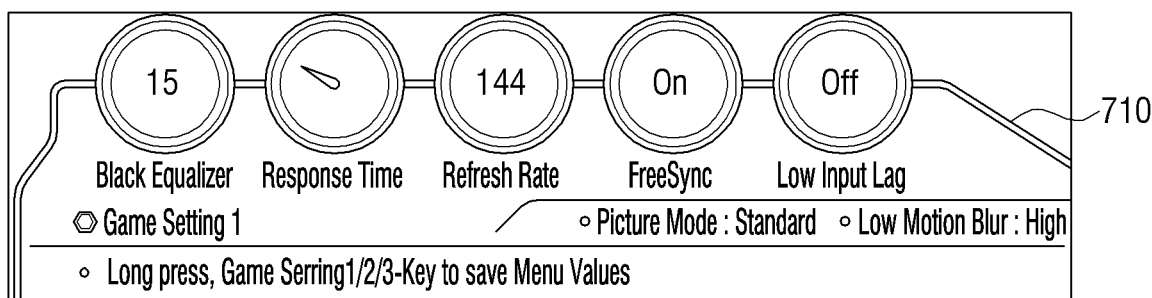

The UI 710 providing the information that relates to the output setting value may be a UI having a dashboard form, as illustrated in FIG. 7B. However, the form of the UI is not limited thereto, and therefore, the UI may be implemented without regard to a form if it may provide the information relating to the output setting value.

For example, as the output setting value of the display panel 110, there may be at least one of a black equalizer value, a response time, a refresh rate, a free sync setting, a low input lag setting, a picture mode setting, and a low motion blur setting.

Referring to FIG. 7B, the UI 710 providing the information relating to the output setting value may include icons for five main setting values and texts for the remaining setting values. Further, the UI 710 providing the information on the output setting value may also include a guide message that relates to the manipulation of the input 170.

According to an exemplary embodiment, if the preset user input is input via the input 170, the processor 140 may store the output setting value of the display panel 110 at the input timing. Referring to FIG. 7A, the processor 140 may store the output setting value at the input timing, based on a length of the user input that long presses, for example, the first key among the three tactile keys. Next, if the user input clicking the first key among the three tactile keys is input, the processor 140 may change the output setting value of the display panel 110 to the stored output setting value by the long press input.

According to another exemplary embodiment, the processor 140 may control the display panel 110 to display the UI that may store the output setting value. Further, the processor 140 may store the output setting value input via the UI in one of the plurality of tactile keys.

Figure 8A:
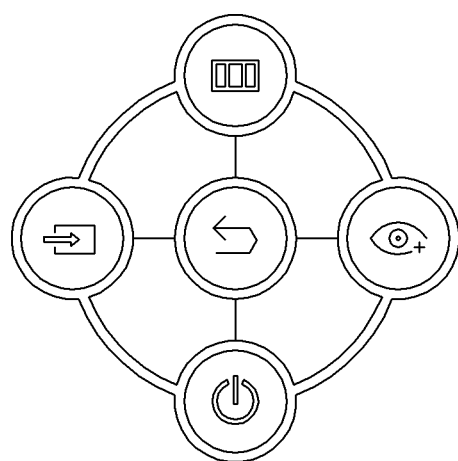
Figure 8B:
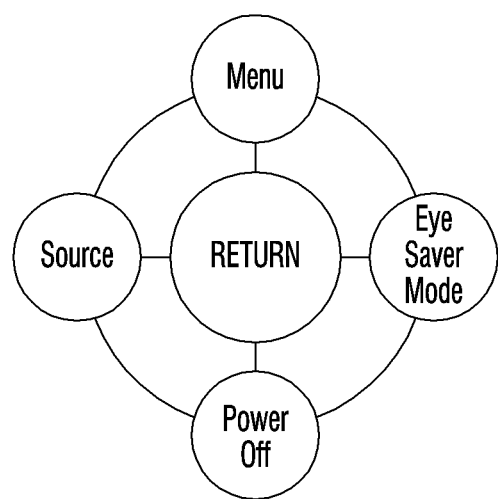
Figure 8C:
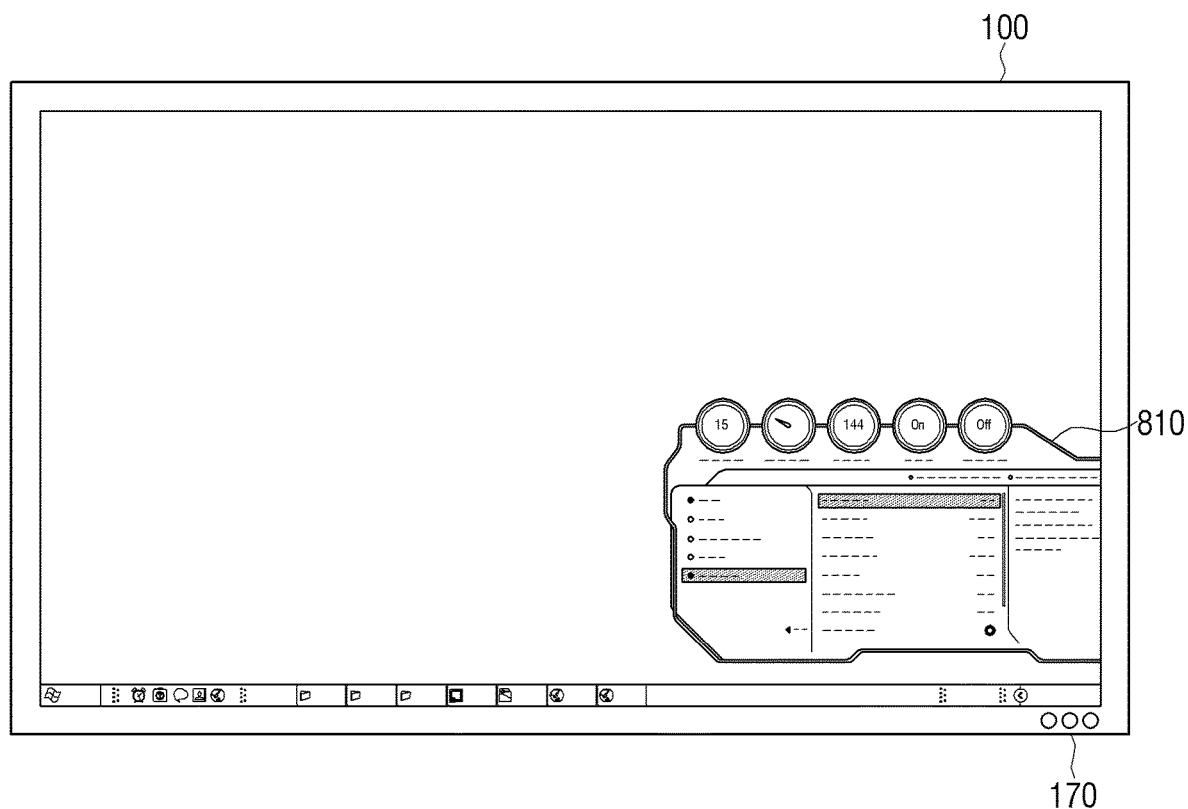

FIG. 8A is a diagram illustrating a jog key disposed on the rear surface of the display panel 110, according to an exemplary embodiment. As illustrated in FIG. 8A, the jog key may be labeled with icons that represent each function. FIG. 8B is a diagram for describing a respective function that is performed by each icon. For example, an icon at an upper portion of FIG. 8A corresponds to an icon displaying a menu UI. If the icon displaying the menu UI is selected, as illustrated in FIG. 8C, the processor 140 may control the display panel 110 to display the menu UI 810.

Figure 8D:
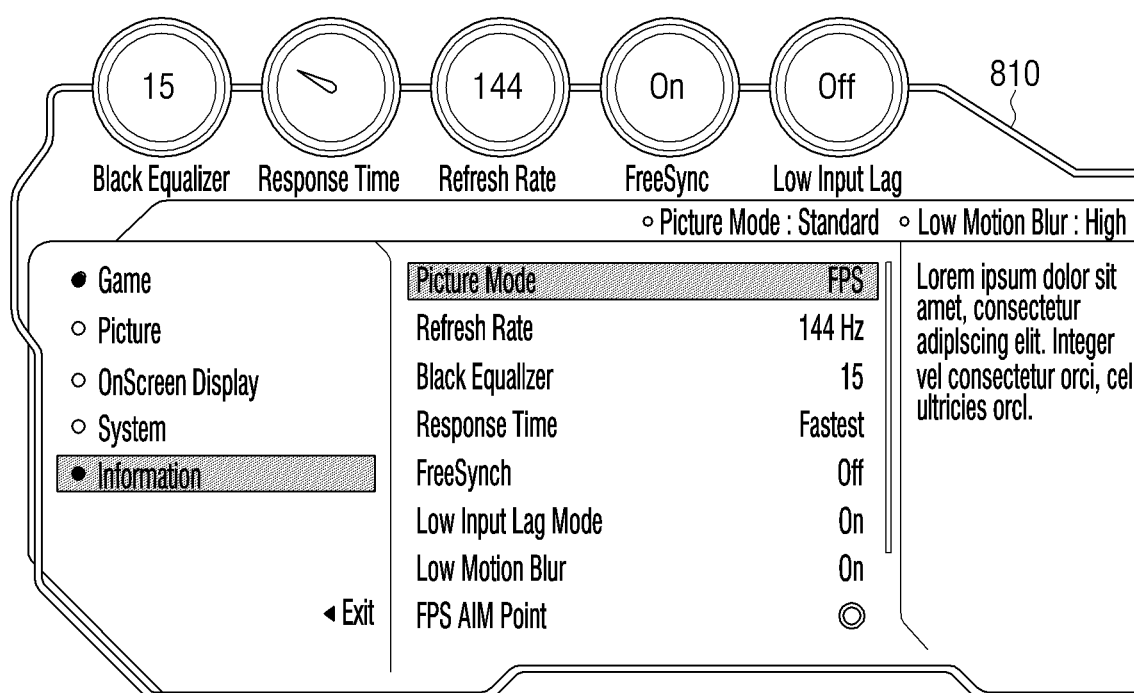
Figure 8E:
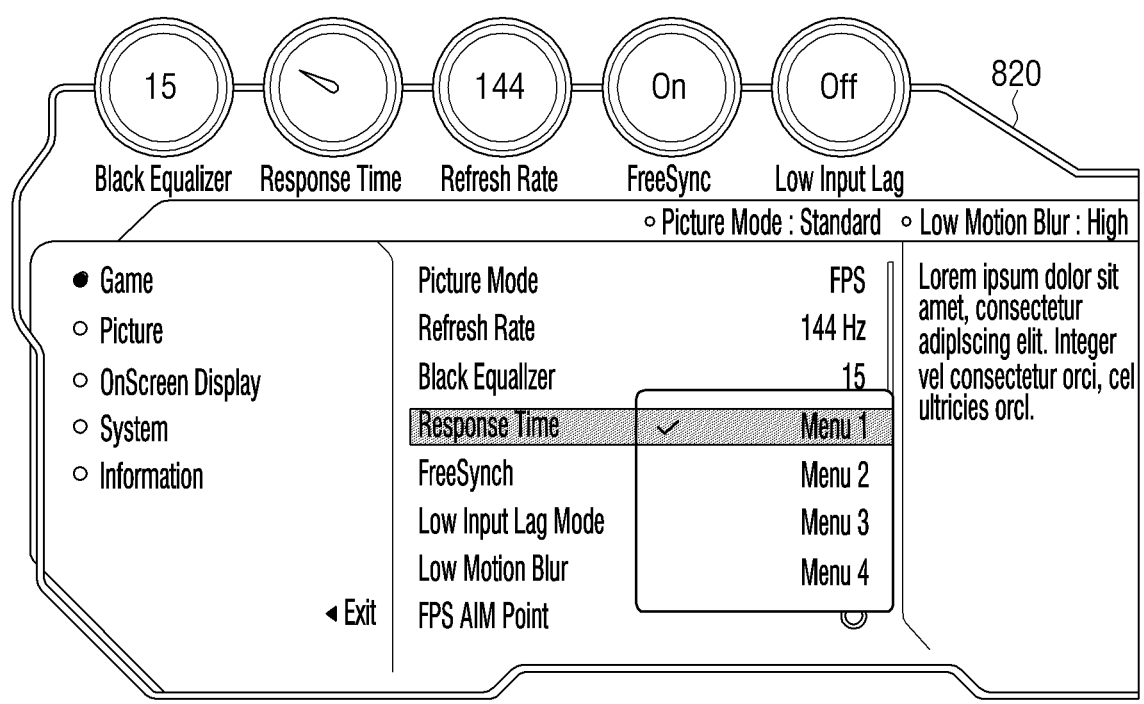

FIGS. 8D and 8E are diagrams illustrating menu UIs 810 and 820 that may set the output setting value of the display panel 110 in the display apparatus 100, according to an exemplary embodiment. The form of the menu UI is not limited to the forms illustrated in FIGS. 8D and 8E.

Referring to FIG. 8D, the menu UI 810 may include a UI element that may set a picture mode, a refresh rate, a black equalizer, a response time, a free sync, a low input lag, a low motion blur, or the like. If the output setting value is changed, the changed value may be reflected even to the dashboard disposed at the upper portion of the menu UI 810. Therefore, the user may intuitively confirm the output setting value.

Referring to FIG. 8E, each UI element of the menu UI 820 may include a sub menu represented as a list type. For example, the element setting the picture mode may include a sub menu of 'standard, auto, FPS, RTS, RPG, AOS, AdobeRGB, sRGB, DCI, Custom', or the like. As another example, the element setting the refresh rate may include a sub menu of '60 Hz, 90 Hz, 120 Hz, 144 Hz', or the like.

FIGS. 9A, 9B, 9C, 9D, 9E, and 9F are diagrams illustrating a UI storing the output setting value of the display apparatus 100, according to an exemplary embodiment.

Figure 9A:
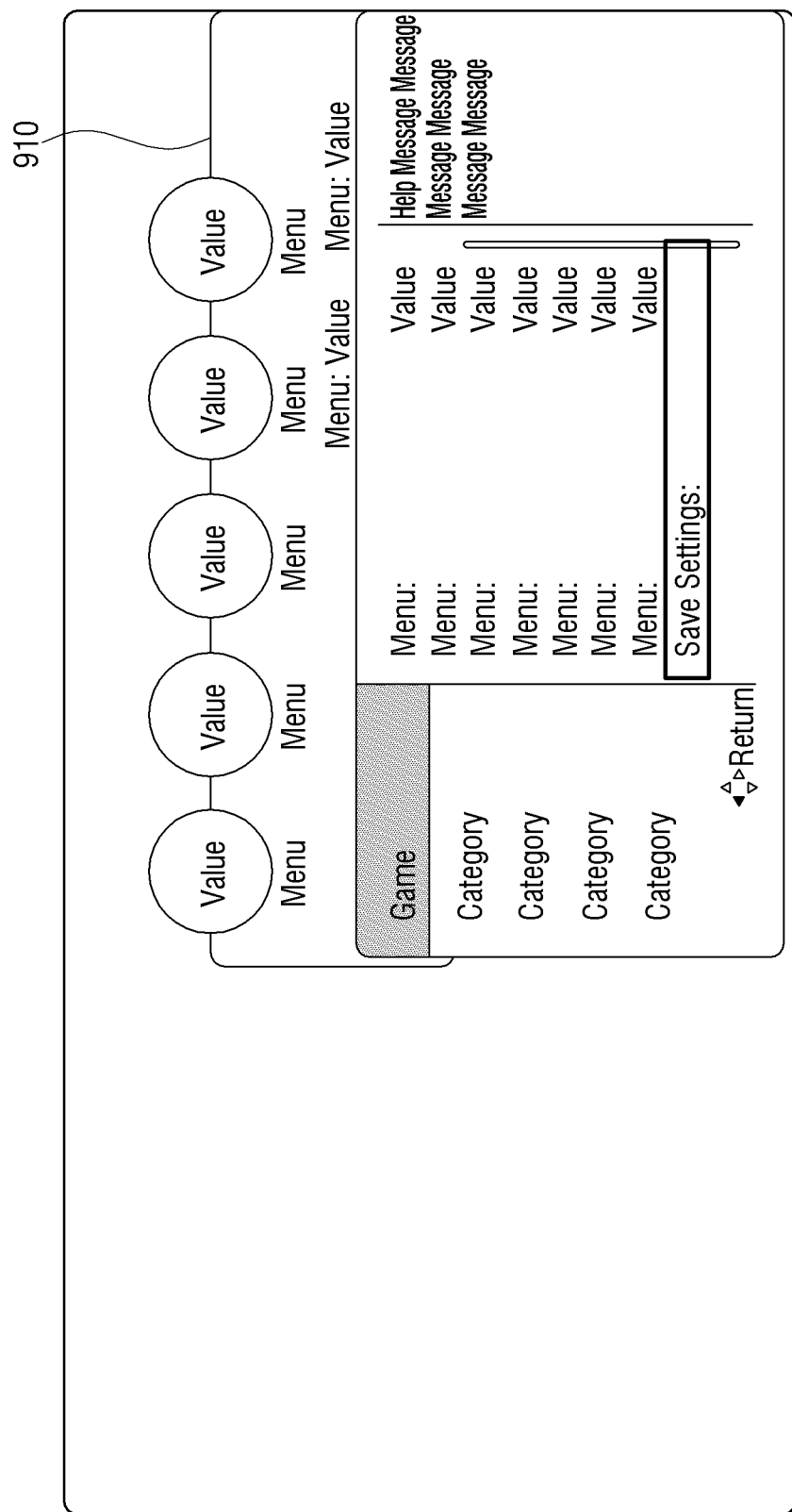

FIG. 9A is a diagram illustrating a UI screen 910 selecting a set store menu of a game category. The processor 140 may control the display panel 110 to perform highlight processing on a selected 'save settings' element and display the processed element. At this point, if a user input that corresponds to pressing an 'ENTER' button or a 'right' button is received, the processor 140 may control the display panel 110 to change the screen to an UI screen 920 illustrated in FIG. 9B and display the UI screen 920.

Figure 9B:
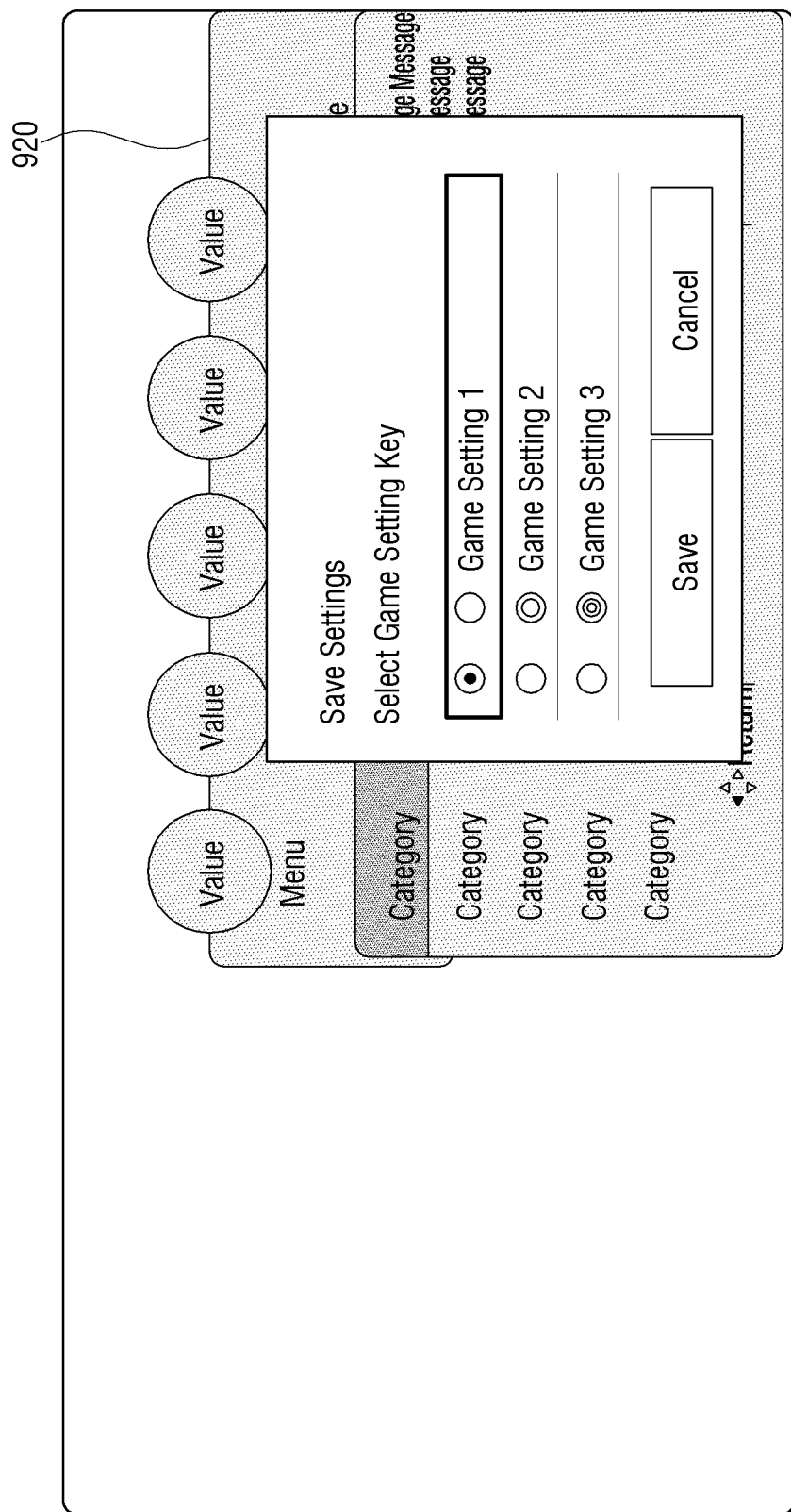

Referring to FIG. 9B, it can be appreciated that a slot that may store the setting value is three. Only three slots are illustrated because three physical tactile keys are present, similarly as illustrated in the exemplary embodiment of FIG. 7A.

To select the slot that may store the setting value, an up and down button may be used. For example, if a user input that corresponds to pressing a 'down' button is received while the UI screen 920 illustrated in FIG. 9B is displayed, the processor 140 may control the display panel 110 to change the screen to a UI screen 930 illustrated in FIG. 9C and display the UI screen 930. In contrast, if a user input that corresponds to pressing an 'up' button is received while the UI screen 930 illustrated in FIG. 9C is displayed, the processor 140 may control the display panel 110 to change the screen to the UI screen 920 illustrated in FIG. 9B and display the UI screen 920.

Figure 9C:
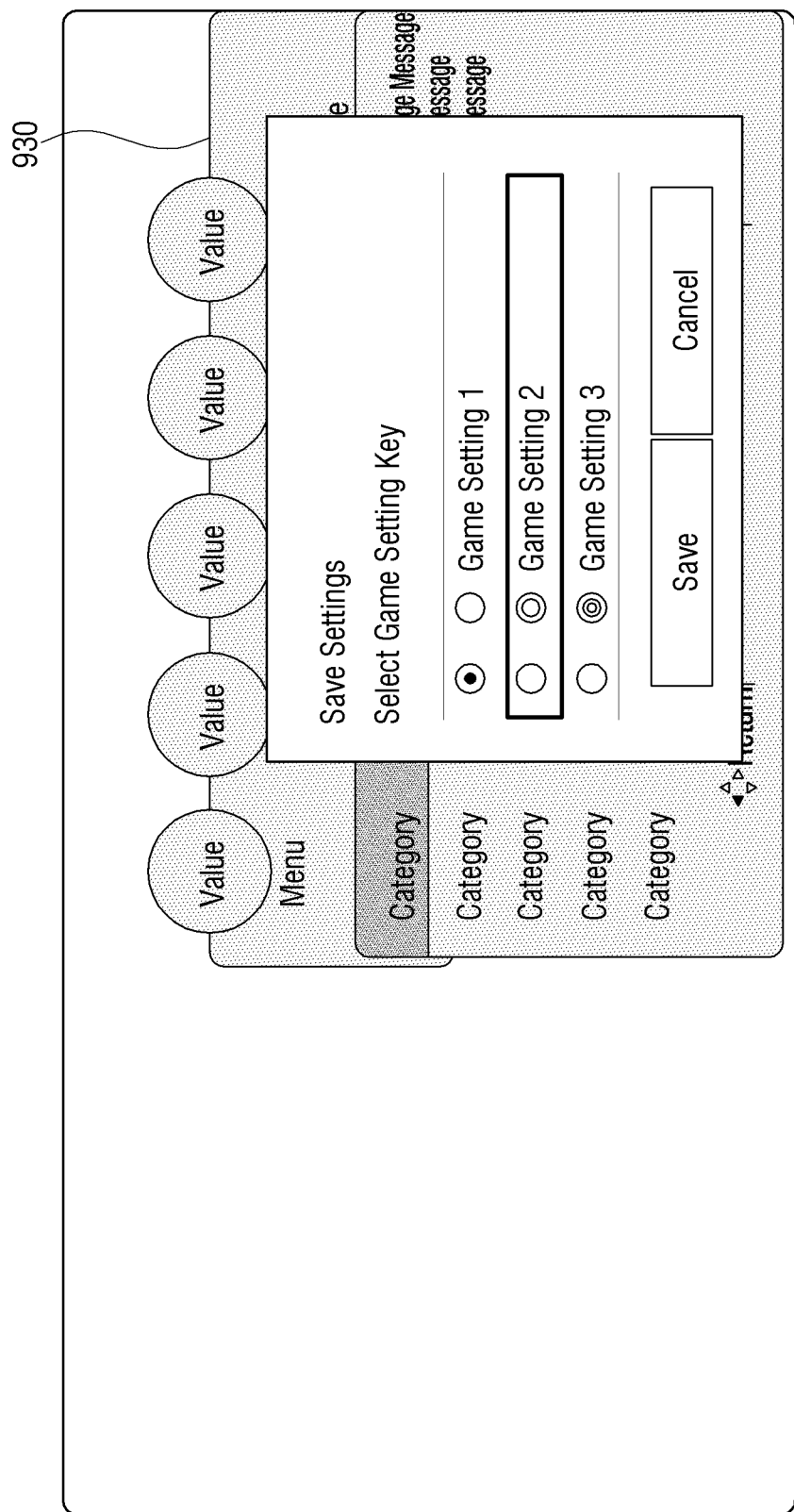
Figure 9D:
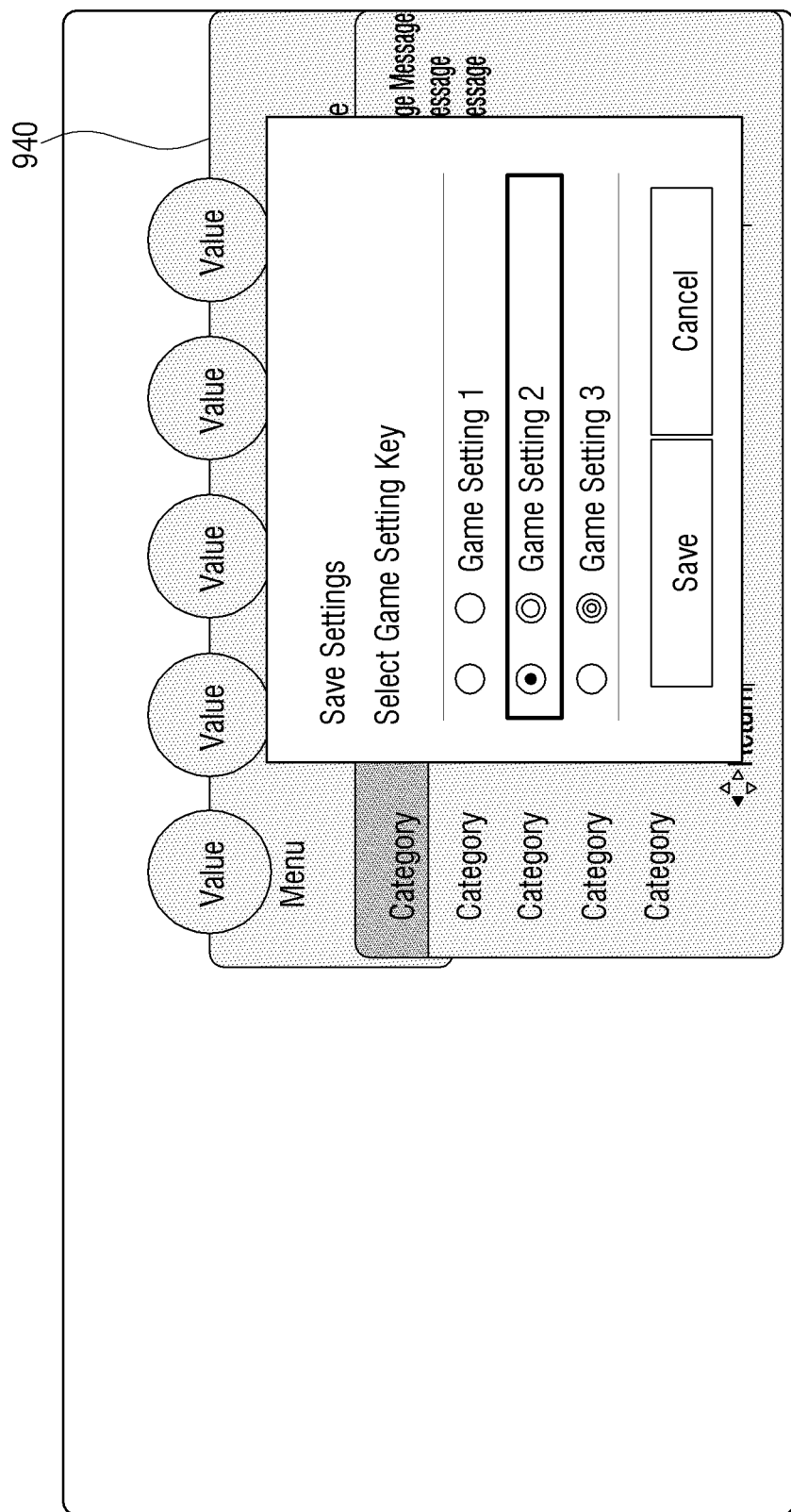

As illustrated in FIG. 9C, if a user input that corresponds to pressing the 'ENTER' button is received while a 'Game Setting 2' slot is highlighted and displayed, the processor 140 may control the display panel 110 to change the screen to a UI screen 940 illustrated in FIG. 9D and display the UI screen 940. In FIG. 9D, it can be appreciated that a dot is represented at a center of a circle in front of the 'Game Setting 2' and thus the 'Game Setting 2' slot is selected.

Figure 9E:
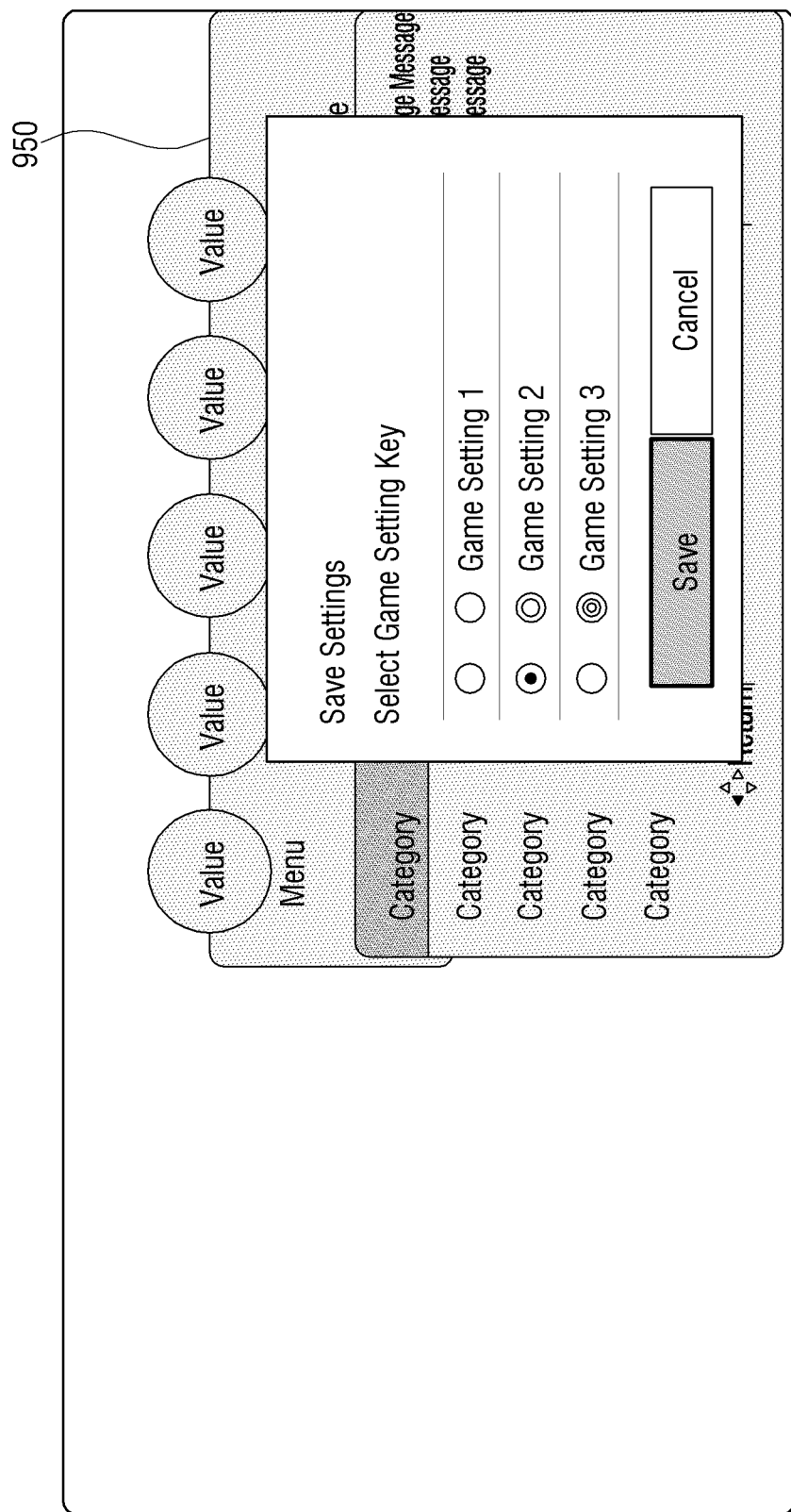

To store the setting, there is a need to move to a lower 'Save' button. If a user input that corresponds to pressing the 'down' button twice is received, the processor 140 may control the display panel 110 to change the screen to an UI screen 950 illustrated in FIG. 9E and display the UI screen 950. As illustrated in FIG. 9E, the processor 140 may control the display panel 110 to perform highlight processing on a selected 'save' portion and display the processed portion.

Figure 9F:
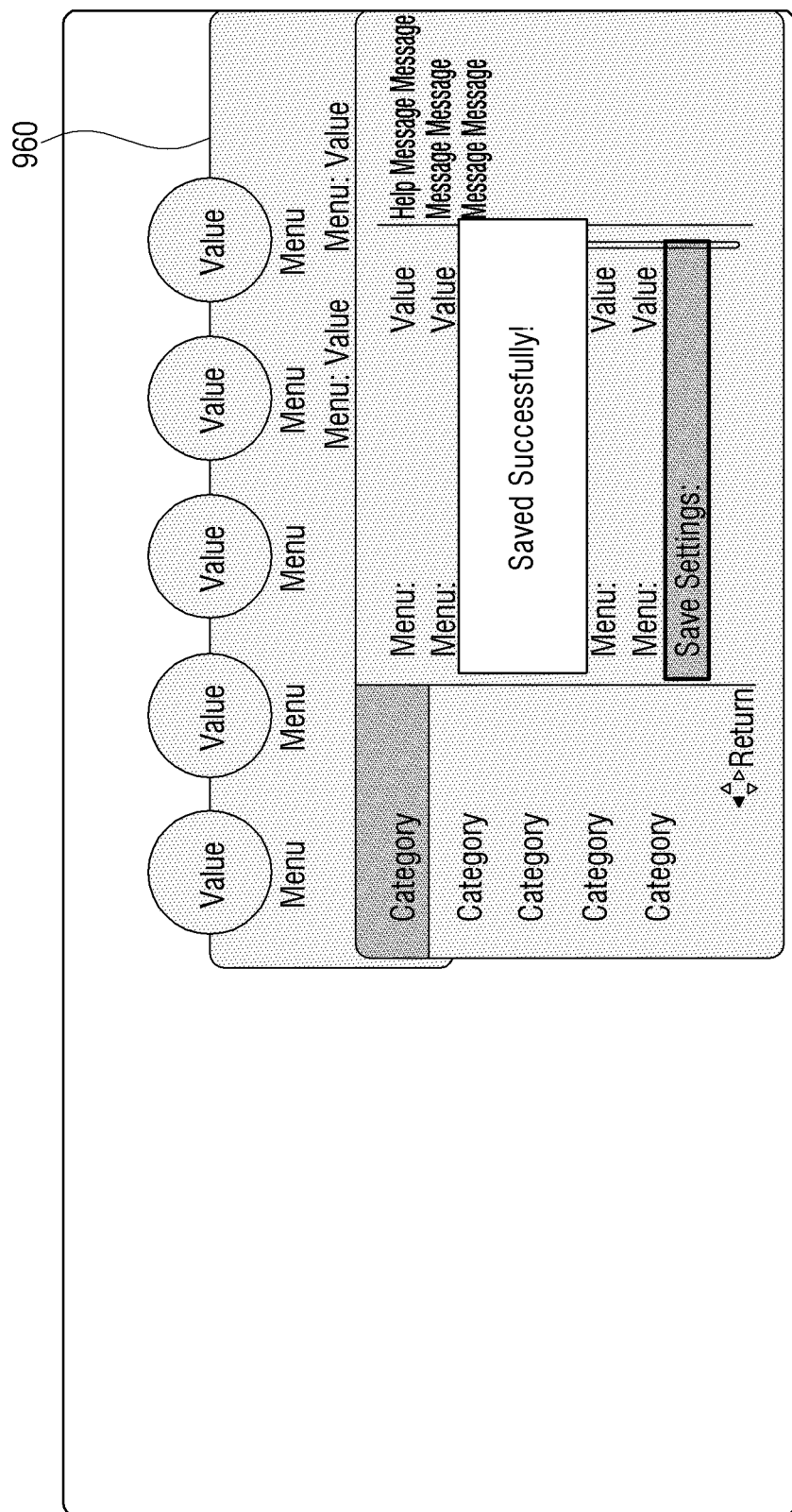

If a user input that corresponds to pressing the 'ENTER' button is received while the UI screen 950 illustrated in FIG. 9E is displayed, the processor 140 may control the display panel 110 to change the screen to a UI screen 960 illustrated in FIG. 9F and display the UI screen 960. Referring to FIG. 9F, it can be appreciated that the guide message 'Saved Successfully!' is displayed. The processor 140 may control a guide message window to disappear if a preset time (for example, 2 seconds) lapses.

Regarding the display apparatus 100 according to various exemplary embodiments as described above, various effects and interaction may be provided to the user based on the content provided via the screen. The user may obtain the user experience with more immersion by the change in surrounding environment due to the lighting that is flickered in response to the audio signal.

Figure 10:
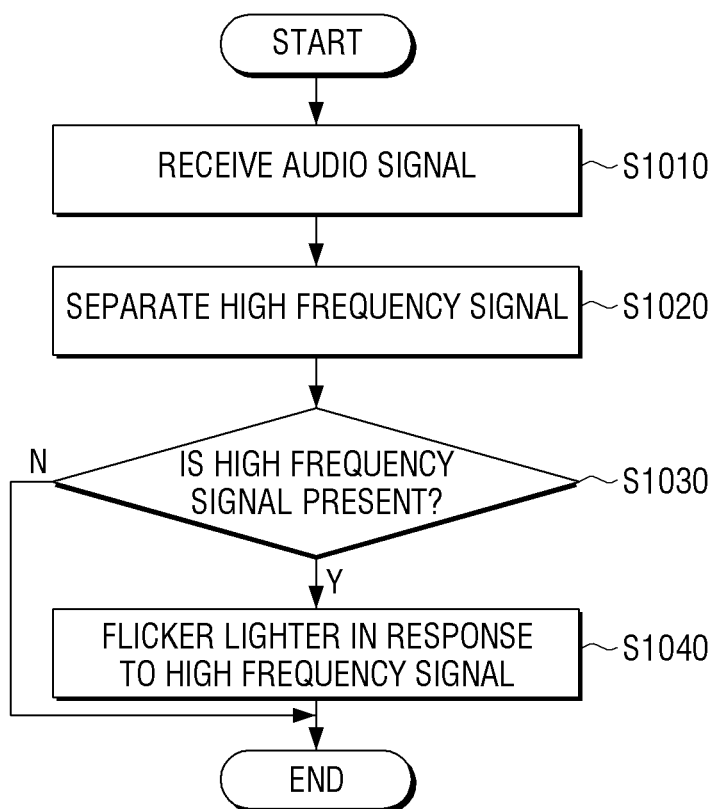
FIGS. 10 and 11 are flow charts for describing a controlling method of a display apparatus, according to various exemplary embodiments.

FIG. 10 is a flow chart for describing a controlling method of a display apparatus 100, according to an exemplary embodiment.

Referring to FIG. 10, in operation S1010, the display apparatus 100 may receive the audio signal. For example, the display apparatus 100 may receive the audio signal of the content displayed on the screen via the sound card, the HDMI, the DP, or the like.

Further, in operation S1020, the display apparatus 100 may separate the high frequency component from the received audio signal. For example, the display apparatus 100 may separate the high frequency component by using a high pass filter. As another example, the display apparatus 100 may also analyze the frequency component of the input audio signal by using a sampling technique.

The reason for separating the high frequency component of the audio signal is that the case in which the sound corresponding to the high frequency component is generated simultaneously with generating the visual effect on the game screen often occurs. Therefore, the lighting effect is provided to the outside of the screen in response to the high frequency audio signal, and as a result the display apparatus 100 may provide a more realistic user experience.

In operation S1030, a determination is made as to whether a high frequency signal is present. If the high frequency component is present in the input audio signal (S1030-Y), then in operation S1040, the display apparatus 100 may flicker the lighter included in the display apparatus 100 in response to the high frequency signal. Further, the display apparatus 100 may also change the brightness level of the lighter in response to the level of the separated high frequency component.

Figure 11:
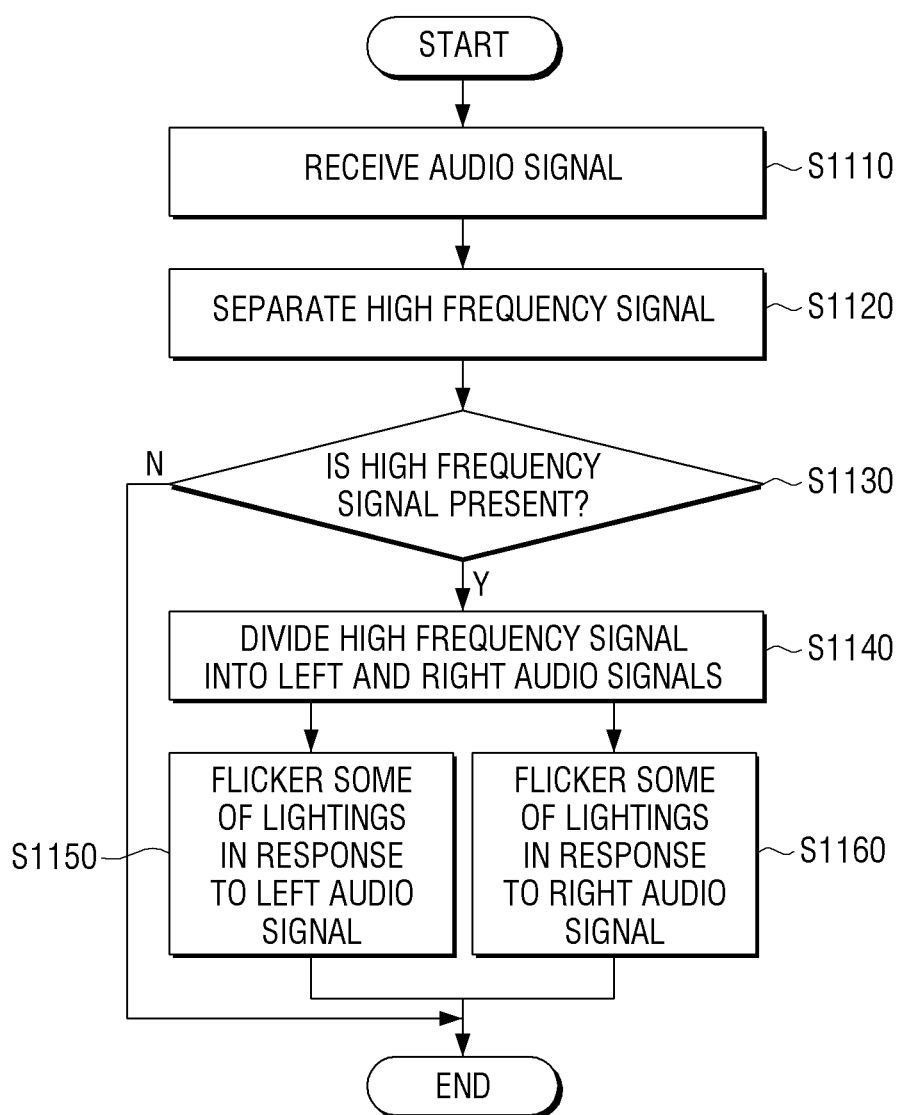

FIG. 11 is a flow chart for describing a controlling method of a display apparatus 100, according to another exemplary embodiment. FIG. 11 illustrates the example of the display apparatus 100 including the plurality of lighting elements.

Referring to FIG. 11, in operation S1110, the display apparatus 100 may receive the audio signal. Further, in operation S1120, the display apparatus 100 may separate the high frequency component from the input audio signal. Steps S1110 and S1120 correspond to steps S1010 and S1020, and therefore the detailed description thereof will be omitted.

In operation S1130, a determination is made as to whether a high frequency signal is present. If the high frequency component is present in the input audio signal (S1130-Y), then in operation S1140, the display apparatus 100 may divide the high frequency audio signal into the left and right audio signals. The exemplary embodiment of FIG. 11 corresponds to the example of the stereo audio system that may be divided into the left and right audio signals. In the case of an example of a multi-channel audio system, the display apparatus 100 may classify the audio signal in accordance with the number of channels.

In operation S1150, the display apparatus 100 may flicker some of the lighting elements in response to the left audio signal. Further, in operation S1160, the display apparatus 100 may flicker some of the lighting elements in response to the right audio signal. For example, the lighting elements disposed at the left of the display apparatus 100 may be flickered in response to the left audio signal. Further, the lighting elements disposed at the right of the display apparatus 100 may be flickered in response to the right audio signal.

According to the control method of the display apparatus 100 according to an exemplary embodiment, the display apparatus 100 may generate the effect of flickering the lighting even though it does not interwork with the audio signal. For example, if the event is generated in one area of the displayed screen, the display apparatus 110 may flicker the plurality of sub lightings such that each of the plurality of sub lightings has a respective brightness level that varies based on the position at which the event is generated and the distance between respective pairs of the sub lightings. The display apparatus 100 may set the brightness level of the sub lighting nearest to the position where the event is generated to be a highest brightness level, and may set the brightness level of the sub lighting farthest from the position where the event is generated to be a lowest brightness level.

The methods according to the exemplary embodiments may be implemented in a form of program commands that may be executed via various computer means and may be recorded in a transitory or non-transitory computer-readable recording medium. The computer-readable recording medium may include a program command, a data file, a data structure or the like, alone or a combination thereof. The program commands recorded in the computer-readable recording medium may be especially designed and constituted for the present disclosure or be known to those skilled in a field of computer software. An example of the computer readable recording medium may include magnetic media, such as hard disk, floppy disk, magnetic tape, and the like, optical media such as compact disk-read-only memory (CD-ROM), digital versatile disk (DVD), and the like, magneto-optical media such as floptical disk, and hardware devices specially configured to store and perform program commands such as read-only memory (ROM), random access memory (RAM), flash memory, and the like. Examples of the program commands may include a high-level language code capable of being executed by a computer using an interpreter, or the like, as well as a machine language code made by a compiler. The hardware device may be constituted to be operated as one or more software modules in order to perform the action according to the exemplary embodiments, and vice versa.

Although the exemplary embodiments have been disclosed for illustrative purposes, those skilled in the art will appreciate that various modifications, additions and substitutions are possible, without departing from the scope and spirit of the present disclosure as disclosed in the accompanying claims. Accordingly, the scope of the present disclosure is not to be construed as being limited to the described exemplary embodiments, but is defined by the appended claims as well as equivalents thereto.

What is claimed is:

1. A display apparatus comprising:
   a display panel;
   a plurality of light sources;
   an audio input configured to receive an audio signal;
   a filter; and
   a processor configured to:
      divide the received audio signal into a left audio signal and a right audio signal;
      transmit the divided audio signal via two paths including a first path from the processor to an audio output to output a sound corresponding to the divided audio signal, and a second path from the processor to the filter, wherein the filter separates a first high frequency component from the left audio signal and a second high frequency component from the right audio signal, and wherein the first and second high frequency components are equal to or higher than a preset frequency; and
      in response to receiving the first and second high frequency components from the filter, flicker a first light source disposed at a left side of the display panel based on the first high frequency component, and a second light source disposed at a right side of the display panel based on the second high frequency component independent of a volume of the sound that is output.

2. The display apparatus as claimed in claim 1, wherein the processor is further configured to adjust a brightness level of the first light source based on a level of the first high frequency component and adjust a brightness level of the second light source based on a level of the second high frequency component.

3. The display apparatus as claimed in claim 1, wherein
   the plurality of light sources include a plurality of sub lighting elements, and
   the flickering comprises flickering a first subset of the plurality of sub lighting elements based on a presence of the first high frequency component, and flicker a remaining subset of the plurality of sub lighting elements based on a presence of the second high frequency component.

4. The display apparatus as claimed in claim 1, further comprising: an input disposed at one side of the display panel, wherein the processor is further configured to change an output setting value of the display panel based on a user command that is received via the input.

5. The display apparatus as claimed in claim 4, wherein
   the input includes a plurality of tactile keys, and
   based on a key from among the plurality of tactile keys being selected by a user, the processor is further configured to change the output setting value of the display panel to a pre-stored output setting value that corresponds to the selected key.

6. The display apparatus as claimed in claim 5, wherein the processor is further configured to, based on the selected key from among the plurality of tactile keys being selected by the user, control the display panel to display a user interface (UI) providing information about the pre-stored output setting value that corresponds to the selected key.

7. The display apparatus as claimed in claim 4, wherein the output setting value includes at least one from among a black equalizer value, a response time, a refresh rate, a free sync setting, a low input lag setting, a picture mode setting, or a low motion blur setting.

8. The display apparatus as claimed in claim 4, wherein the processor is further configured to, based on a preset user input being received via the input, store the changed output setting value of the display panel at a time at which the preset user input is received.

9. The display apparatus as claimed in claim 1, wherein
   the plurality of light sources include a plurality of sub lighting elements, and
   the processor is further configured to, based on an event being generated in one area of a screen of the display panel, flicker at least one of the plurality of sub lighting elements based on a position at which the event is generated.

10. The display apparatus as claimed in claim 1, further comprising a hinge part configured to change a direction of at least one of the first and second light sources, wherein the processor is further configured to, based on an event being generated in one area of a screen of the display panel, control the hinge part to change the direction of the at least one of the first and second light sources based on a position at which the event is generated.

11. A method of controlling a display apparatus, the method comprising:
    receiving, by the display apparatus, an audio signal;
    dividing the received audio signal into a left audio signal and a right audio signal;

transmitting the divided audio signal via two paths including a first path from a processor of the display apparatus to an audio output to output a sound corresponding to the divided audio signal, and a second path from the processor to a filter, wherein the filter separates a first high frequency component from the left audio signal and a second high frequency component from the right audio signal, and wherein the first and second high frequency components are equal to or higher than a preset frequency; and in response to receiving the first and second high frequency components from the filter, flickering, by the display apparatus, a first light source disposed at a left side of a display panel of the display apparatus based on the first high frequency component, and a second light source disposed at a right side of the display panel based on the second high frequency component independent of a volume of the sound that is output.

12. The method as claimed in claim 11, wherein the first and second light sources include a plurality of sub lighting elements, and the flickering comprises flickering the first and second light sources such that each of the plurality of sub lighting elements has a respective brightness level that varies based on a level of a respective one of the first and second high frequency components.

13. The method as claimed in claim 11, wherein the first and second light sources include a plurality of sub lighting elements, and the flickering includes: flickering a first subset of the plurality of sub lighting elements based on a presence of the first high frequency component, and flickering a remaining subset of the plurality of sub lighting elements based on a presence of the second high frequency component.

14. The method as claimed in claim 11, further comprising:

receiving a user input that relates to selecting one from among a plurality of tactile keys; and outputting a screen that varies based on a pre-stored output setting value that corresponds to the selected key.

15. The method as claimed in claim 14, further comprising: displaying a user interface (UI) configured to provide information that relates to the pre-stored output setting value that corresponds to the selected key.

16. The method as claimed in claim 14, wherein the pre-stored output setting value includes at least one from among a black equalizer value, a response time, a refresh rate, a free sync setting, a low input lag setting, a picture mode setting, or a low motion blur setting.

17. The method as claimed in claim 11, further comprising: based on a preset user input being received, storing an output setting value in conjunction with a time at which the preset user input is received.

18. The method as claimed in claim 11, wherein the first and second light sources includes a plurality of sub lighting elements, and based on an event being generated in one area of a screen of the display apparatus, the flickering includes flickering at least one of the plurality of sub lighting elements based on a position at which the event is generated.

19. The method as claimed in claim 11, further comprising: based on an event being generated in one area of a screen of the display apparatus, changing a direction of at least one of the first and second light sources based on a position at which the event is generated.

20. The display apparatus as claimed in claim 1, wherein the processor is further configured to supply power to the first light source only when the first high frequency component of the left audio signal is present, and to supply power to the second light source only when the second high frequency component of the right audio signal is present.

* * * * *